April 30, 1968 G. F. QUAYLE 3,380,713
CASING FOR HOIST
Filed Oct. 28, 1966 4 Sheets-Sheet 1
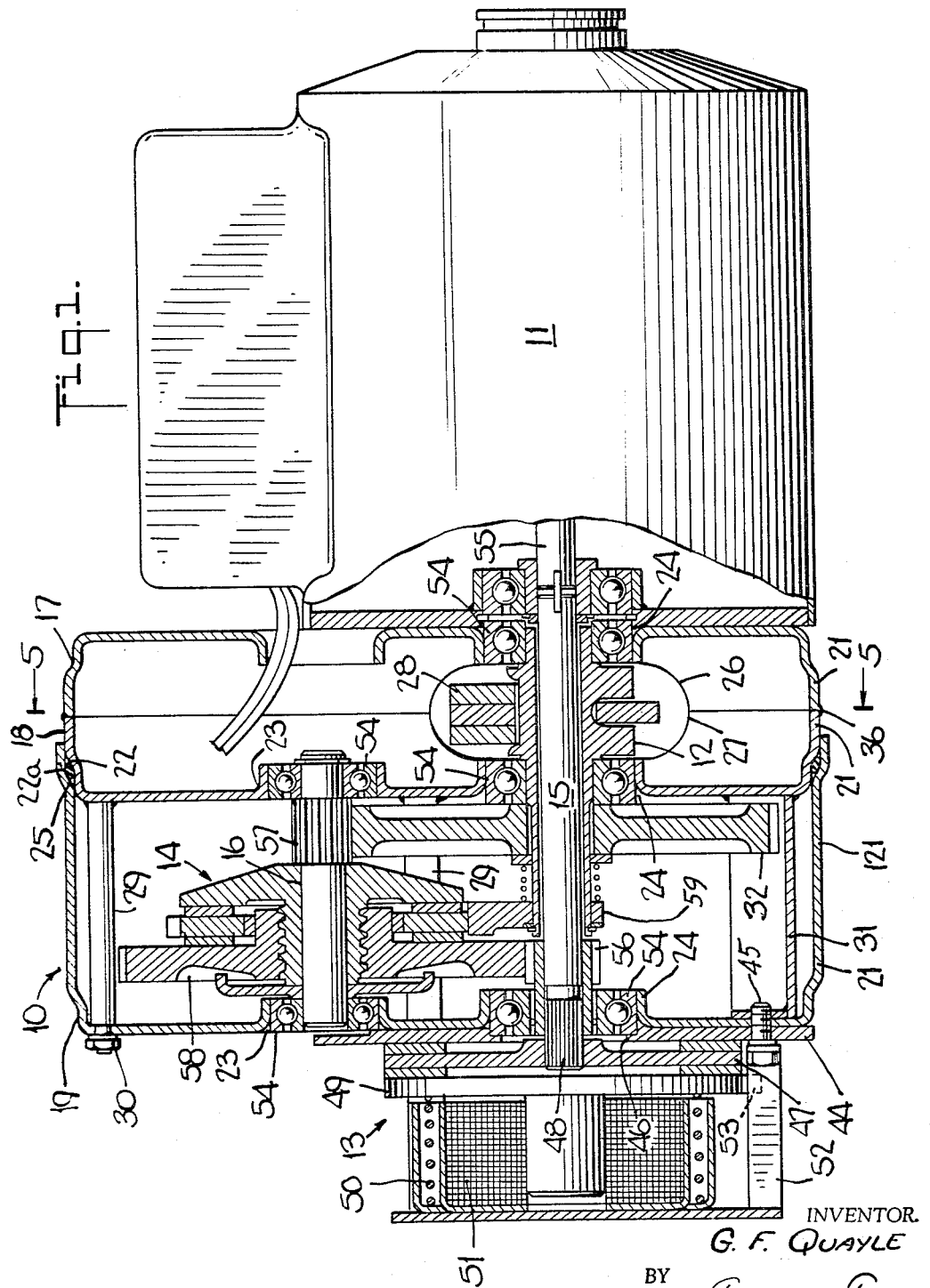
INVENTOR.
G. F. QUAYLE
BY
Teagno & Toddy
ATTORNEYS April 30, 1968 G. F. QUAYLE 3,380,713
CASING FOR HOIST
Filed Oct. 28, 1966 4 Sheets-Sheet 2
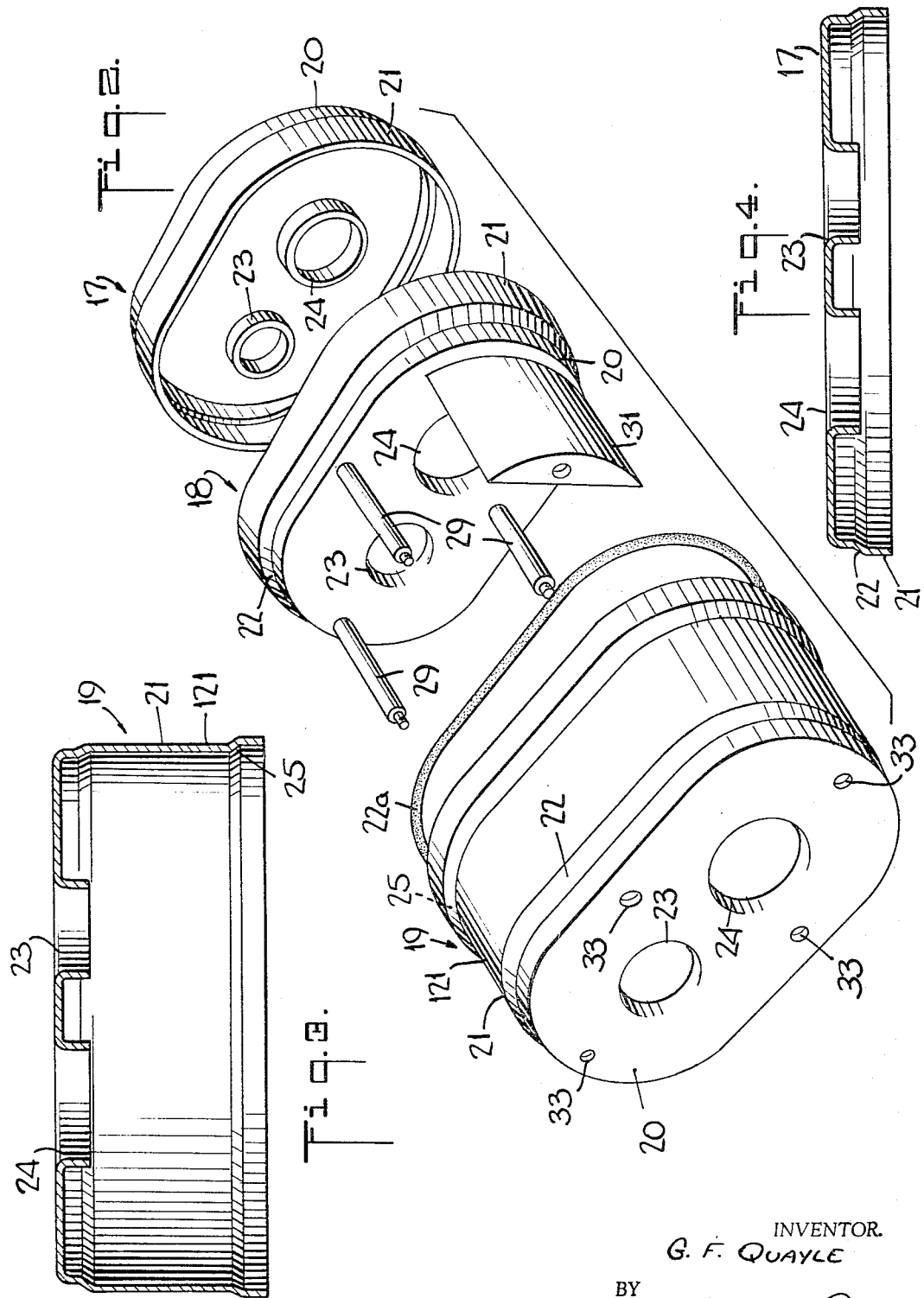
INVENTOR.
G. F. QUAYLE
BY
Teagno & Toddy
ATTORNEYS

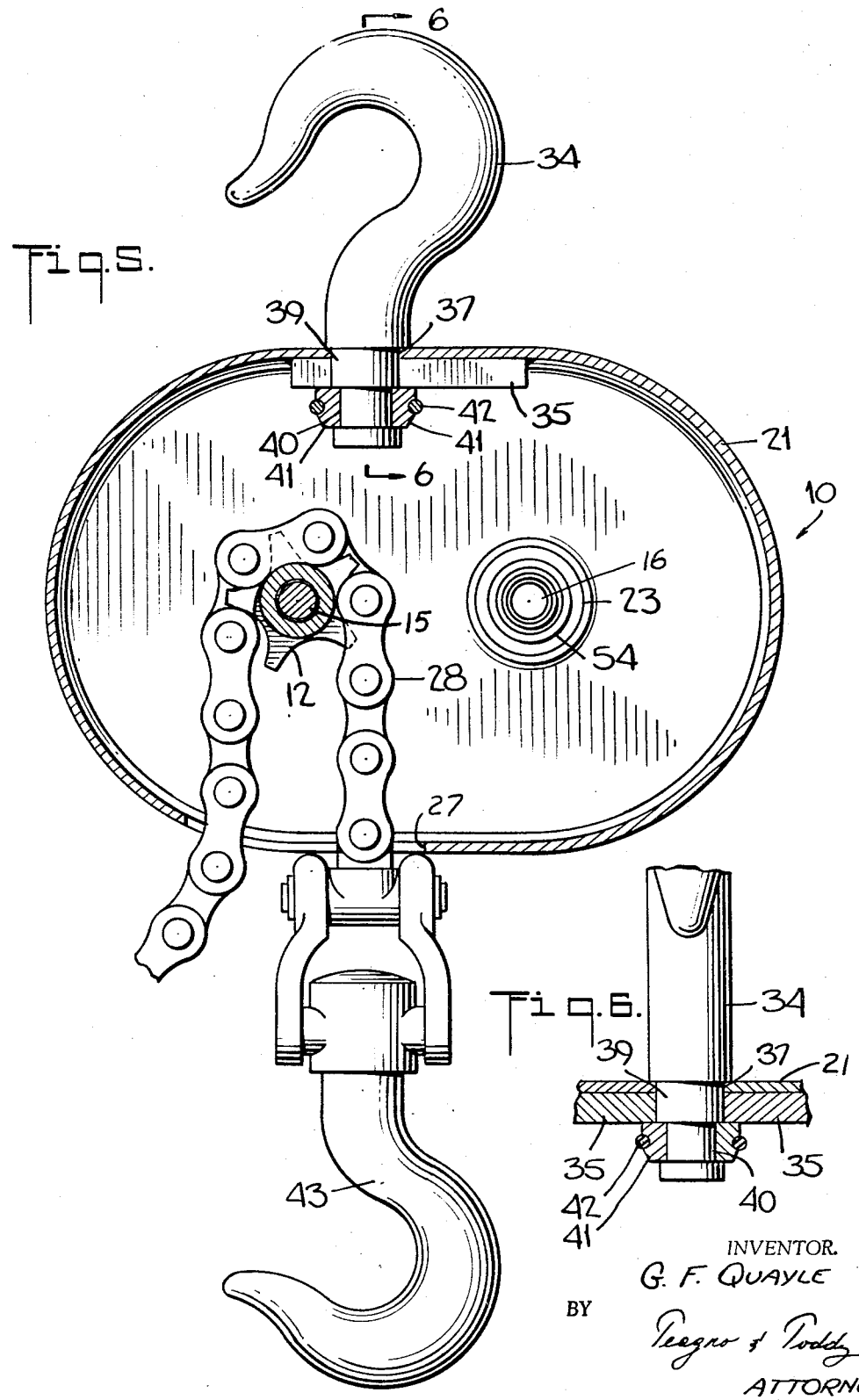

April 30, 1968 G. F. QUAYLE 3,380,713
CASING FOR HOIST
Filed Oct. 28, 1966 4 Sheets-Sheet 4

INVENTOR.
G. F. QUAYLE
BY
ATTORNEYS

# United States Patent Office 3,380,713
Patented Apr. 30, 1968

3,380,713
CASING FOR HOIST
George F. Quayle, Philadelphia, Pa., assignor to Eaton Yale & Towne Inc., Cleveland, Ohio, a corporation of Ohio
Filed Oct. 28, 1966, Ser. No. 590,366
14 Claims. (Cl. 254—167)

ABSTRACT OF THE DISCLOSURE

A hoist casing formed by assembling three sheet metal members each having the same dish shape, including a flat bottom part and a wall part on the periphery of the bottom part. Two of the dish-shaped members are welded together at their rims so as to form a chamber for the load sheave of the hoist. The wall part on the third member has an extended portion which is secured to the bottom part of another member so as to enclose a relatively large chamber for a Weston brake and hoist gearing. Bearing openings are formed at the same position in each of the bottom parts of the dish-shaped members, and support shaft bearings in aligned relation to each other when the members are assembled. The wall parts of the two dish-shaped members that are welded together are equipped with reinforcing blocks that are juxtaposed to each other so as to form in effect a single block, in which is an opening for the shank of a support hook for the hoist.

---

My invention relates to hoists, and more particularly to a novel form of casing for a hoist.

As will be appreciated, the casing of a hoist generally represents a very substantial part of the cost of the hoist. That is due to the fact that the casing must be particularly designed to accept the forces incidental to the lifting of a load, while supporting in particular relation to one another a load sheave, a brake, and other operating parts. It generally is important that the casing permit a compact arrangement of the parts in their particular relation, so that the casing may be as small as possible.

Through the novel concept of my invention, it will be possible to equip a hoist with a casing that will serve extremely well, and that can be manufactured at a cost which is considerably less than was necessary heretofore. As a feature of my invention, I utilize a series of sheet metal casing members that comprise the same dish shape, so that they are very well adapted to be formed through the use of the same tools. I may form two of the members as duplicates that can be assembled in opposed relation to form a casing chamber. I utilize a third member of the series of dish-shaped members for assembly to the outer surface of one of the first two members, so as to form a second chamber. In the forming of the three members, I make bearing openings at corresponding points on each member so that the openings will be aligned in relation when the members are assembled, enabling me to utilize the openings for mounting shafts for operating parts of the hoist.

As a further feature, I equip the hoist casing of my invention with novel means for mounting a hoist supporting hook. Through those novel means, the supporting hook has a very rigid reinforced relation to the casing, the effect being somewhat the same as though the casing were a casting rather than sheet metal. As a particular part of this feature, I utilize a pair of bearing members for the supporting hook and I assemble those bearing members through means that will effectively accept the weight of the hoist and its load so as to retain the support hook, while acting as bearings for the hook.

As a further feature of my invention, I equip one of the members of the casing with a brake member that forms a part of a novel hoist brake. More particularly, I secure a brake disc to the surface of the casing, and in coacting relation to that disc I arrange a further disc that rotates with one of the hoist shafts.

I have thus outlined rather broadly the more important features of my invention in order that the detailed description thereof that follows may be better understood, and in order that my contribution to the art may be better appreciated. There are, of course, additional features of my invention that will be described hereinafter and which will form the subject of the claims appended hereto. Those skilled in the art will appreciate that the conception on which my disclosure is based may readily be utilized as a basis for the designing of other structures for carrying out the several purposes of my invention. It is important, therefore, that the claims be regarded as including such equivalent constructions as do not depart from the spirit and scope of my invention, in order to prevent the appropriation of my invention by those skilled in the art.

In the drawings:

FIG. 1 shows a horizontal section of a hoist on which I utilize my novel casing.

FIG. 2 is an exploded view showing parts of the casing as they appear after forming, and with securing means attached.

FIG. 3 shows a sectional view of one of the casing parts.

FIG. 4 shows a sectional view of a casing part.

FIG. 5 shows a section substantially on the line 5—5 in FIG. 1.

FIG. 6 is a section on the line 6—6 in FIG. 5, showing the novel hook mounting on my casing.

Figure 7:
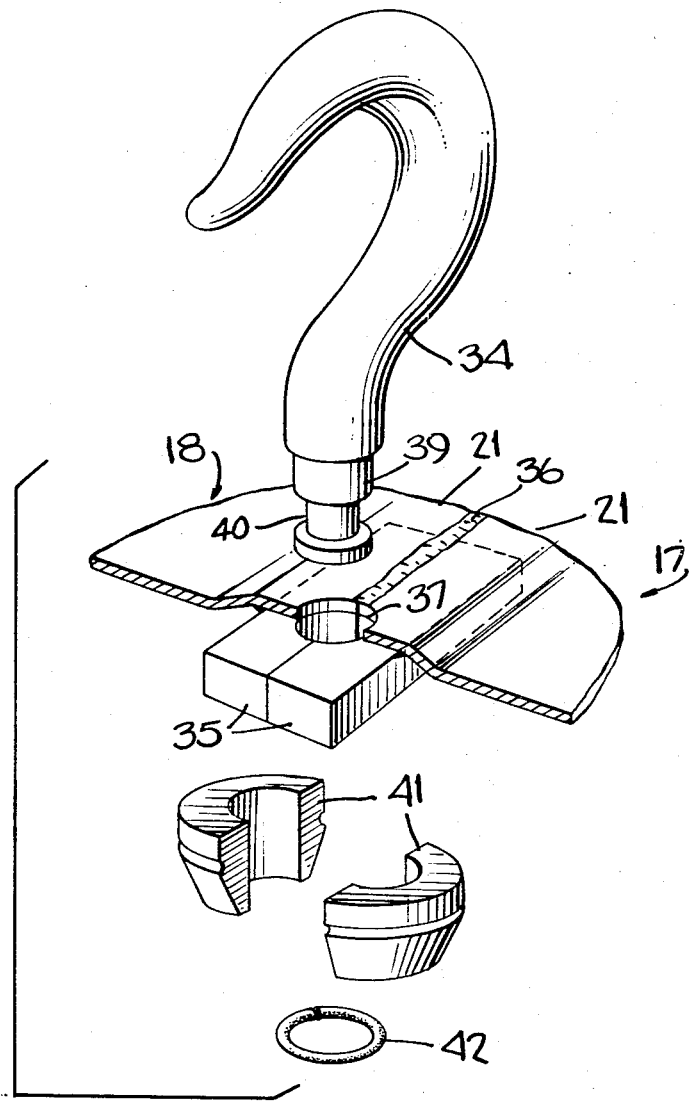
FIG. 7 shows an exploded perspective view of parts shown in FIG. 6.

Referring now more particularly to FIG. 1 of the drawings, I indicate my novel hoist casing by the numeral 10, and I show in assembled relation to the casing a series of hoist operating parts including a motor 11, load sheave 12, brake mechanisms 13, 14 and shafts 15, 16. I shall refer in more detail to those operating parts, but first I shall describe the features of casing 10. Thus, that casing comprises three sheet metal members 17, 18 and 19, shown assembled in FIG. 1. So that the form of the members 17, 18, 19 may more easily be understood, I show those members in FIGS. 2, 3 and 4 as they appear after forming but before they are finished and assembled. Thus, each of the members 17, 18 and 19 has an oblong dish shape which is the same as that of the other members, including a bottom part 20, and an integral wall part 21 extending from the periphery of bottom part 20.

As best seen in FIG. 2, each member 17, 18, 19 is symmetrical about a transverse axis. Near the bottom of each member 17, 18, 19, the metal is offset so as to form a peripheral shoulder 22, and the wall part 21 is so formed on each member as to have a substantially uniform cross-sectional shape extending from the shoulder 22. Each bottom part 20 perferably is flat and I form each of those parts with two circular flanges that define separate bearing openings 23, 24. The openings 23 are so arranged at corresponding points on members 17, 18, 19 as to be in aligned relation to one another when those members are assembled, and the same is true of the openings 24. In the form that I prefer and that I show in the drawings, the openings 23, 24 actually are at points in the longer transverse axis of each dish-shaped member 17, 18, 19.

It will be seen that the dish-shaped member 19 is deeper than is each member 17, 18, the wall part 21 on member 19 being extending as shown at 121. The extended portion 121 forms a rim on the dish-shaped member 19, and I prefer to offset the metal of the rim to form an inner peripheral shoulder 25, though I do not wish to be so limited. In any event, there will be on each dish-shaped member 17, 18, 19, a rim having the same outline. Thus, the rims of members 17, 18 may meet in opposed relation, as shown in FIG. 1, and the rim of member 19 may fit in opposed relation to shoulder 22 on member 18, the rims of all of the members then being in parallel relation. At this point, I might indicate that an O-ring 22a may be assembled against the shoulder 22 for preventing a seepage of lubricant from the interior of casing member 19.

From the description that I have thus far made, those skilled in the art will appreciate that each of the dish-shaped members 17, 18, 19 can be formed through a rather simple and usual type of operation, utilizing the same tools. Actually, the members 17, 18 are formed as duplicates of each other. Member 19 can be formed in the same way, it merely being necessary further to form the extended wall portion 121 and its shoulder 25.

After the forming of the members 17, 18, 19, those members can be finished merely through a few operations that are simple and that can be performed at low cost. Thus, as shown in FIG. 1, I cut away portions 26, 27 on the rims of members 17, 18, so as to form an opening for a load chain 28 when casing 10 is assembled. Also, the surface of dish-shaped member 18 may be equipped with securing means such as a series of welded studs 29, each adapted to accept a nut 30 whereby to assemble member 19 to member 18. Welded to the member 18 is a bracket 31 having a bolt 45, serving the same purpose as do the studs 29, but being designed to allow clearance for a gear 32 in casing 10. The dish-shaped member 19 naturally will be formed with a series of openings 33, FIG. 2, for the securing studs and bolt.

A weld 36, FIG. 1, will be applied around the periphery of dish-shaped members 17, 18 to secure their rims to one another, but before assembling those members I equip them with hook mounting means that will be understood when considering FIGS. 5, 6 and 7. Thus, I weld a block portion 35 in position on the wall part 21 at the rim of each member 17, 18. The position is such that the block portions 35 will be juxtaposed whereby to form in effect a single block when casing members 17, 18 are secured by the weld 36.

Through the rims of members 17, 18 and the block portions 35, I form a bore 37 for the shank 39 on the hoist support hook 34. Shank 39 extends inwardly past the block portions 35 and is formed with a groove 40 in its periphery. A pair of complementary bearing members 41 are shaped to fit the groove 40 while engaging the surface of block portion 35, and will be held in that groove by a ring or ferrule 42. The bearing members 41 then will very effectively retain the support hook 34 relatively to the casing 10, while acting as a bearing for rotating movements of the casing on the hook. That is possible because the block portions 35 contribute an effective bearing surface, while reinforcing the casing 10 and enabling it to accept very well the loads that may be placed on the hoist. As is standard practice, and as shown in FIG. 5, the block portions 35 and their bore 37 are so positioned that the support hook 34 will be in vertically aligned relation, or nearly so, to the load part of the chain 28 and its load hook 43.

Referring again to FIG. 1 of the drawings, I secure to the bottom part 20 of the dish-shaped member 19 a fixed brake disc 44 that forms a part of brake mechanism 13. That may be done, for example, by the bolt 45 that secures bracket 31, and the nuts on certain of the studs 29. Brake disc 44 has a central opening 46 that is in the axis of the shaft 15. I then mount a rotating brake disc 47 for sliding in an axial direction on a splined end portion 48 of the shaft 15. There is a further disc 49 that is pressed in an axial direction toward disc 47 by a spring 50, and a solenoid 51 that will move disc 47 against its spring pressure and away from disc 47. A bracket 52 supports disc 49, spring 50, and solenoid 51 on the casing member 19. The disc 49 will be held against rotating movements, as by a portion 53 that engages the bracket 52.

The spring 50 normally will press discs 49 and 47 toward disc 44, effecting friction between the discs and holding shaft 15 against rotation. When solenoid 51 is energized, the frictional pressure will be relieved, enabling disc 47 and shaft 15 to rotate. Thus, through relatively simple and inexpensive means, I may equip my novel casing 10 with an effective solenoid operated brake mechanism 13.

I have referred briefly to hoist operating parts that are mounted on my novel hoist casing 10, and I shall indicate here that ball bearings 54 will be mounted in the casing openings 23, 24 for supporting the load sheave 12, shaft 15, and brake mechanism 14. The hoist motor 11 will be mounted through suitable means, not shown, on the bottom of casing member 17, with its shaft 55 in aligned relation to the casing openings 24. Shaft 15 is connected at one end to motor shaft 55, and is mounted at its opposed end through a pinion 56 that is assembled on the shaft 15 and that rotates in a corresponding bearing 54 on casing member 19. It will be seen that the solenoid brake mechanism 13 will act directly through shaft 15 for controlling motor shaft 55, and also pinion 56.

I show the load sheave 12 formed with a wide central bore through which shaft 15 extends, and mounted through the corresponding bearing 54 on each of the casing members 17, 18. The gear 32 is keyed to a part of sheave 12 that extends within the chamber between casing members 18, 19. Shaft 16 is mounted in position within that chamber, being supported through a bearing 54 on each of the casing members 18, 19, and is formed with a toothed portion 57 meshing with gear 32. The brake mechanism 14 is mounted on shaft 16 and comprises a brake of the Weston type. A toothed disc 58 of that brake meshes with pinion 56, and there is a pawl 59 for coacting with brake mechanism 14. Thus, the hoist motor 11 and brake mechanism 13 will act through the Weston brake mechanism 14 to control the movements of load sheave 12 and its chain 28.

I might indicate that the Weston brake and pawl arrangement which I show in the drawings actually is like that which is set forth in the copending application of Charles S. Schroeder, Ser. No. 590,331. However, for the purpose of my description we may consider that the brake mechanism 14 will operate in the conventional manner of a Weston brake, and I believe that it need not be described in further detail. It is merely necessary to know here that the novel casing of my invention will very effectively be utilized to support the hoist operating parts that are desired.

I believe that those persons skilled in the art now will appreciate that the novel concept of my invention will enable a hoist to be manufactured at relatively low cost. Thus, while meeting the requirements of a hoist casing extremely well, my construction merely need utilize sheet metal, and can be manufactured through a few operations that will entail little expense. I believe, therefore, that the very considerable merits of my invention will be fully understood.

I now claim:

1. A casing for a hoist comprising a pair of duplicate dish-shaped members secured together at their rims to form a casing chamber, a third member having the same dish shape as each of said duplicate members and including a bottom part which is the same size as the bottom part of each of said duplicate dish-shaped members, said third member adapted to be formed by the tools forming said two duplicate members, bearing openings formed in the bottom parts of said pair of members and said third member, means securing the rim of said third member to one of said duplicate members on a line parallel to the first rims whereby to form a further chamber of said casing, and bearings mounted in said openings in the bottom parts of said members for supporting operating portions of a hoist mechanism in the chambers of said casing.

2. A hoist casing as set forth in claim 1, and including said dish-shaped members being formed from sheet metal, a weld securing together the rims of the pair of duplicate members, the rim of the third member being substantially secured to the bottom of one of the duplicate members, and the bottoms of the duplicate and third members being parallel to one another.

3. A hoist casing as set forth in claim 1, and including said dish-shaped members being sheet metal, reinforcing block parts mounted in juxtaposed relation to one another on the rims of said members that are secured together at their rims, said block parts in effect forming a single block, and aligned bores formed in the sheet metal and block for accepting a support member for the hoist.

4. A hoist casing as set forth in claim 1, and including a brake disc formed with an opening, and means securing said brake disc in position on the outer surface of the bottom part of the third dish-shaped member with the opening of said disc in aligned relation to one of said bearings on the particular dish-shaped member.

5. A casing for a hoist comprising three dish-shaped sheet metal members having each a bottom part formed in the same shape as the bottom parts of the other members, each bottom part being shaped with bearing openings, an integral wall part forming on each dish-shaped member a rim of the same outline as the rims of the other members, means securing two of said dish-shaped members together at their rims whereby to form a casing chamber, means securing the rim of the third dish-shaped member to the wall part on one of the first two members whereby to form a second casing chamber, and bearings mounted in bearing openings of said member bottom parts for supporting portions of a hoist mechanism.

6. A construction as set forth in claim 5, in which the bearing openings are formed at corresponding points on the bottom parts of the members whereby to be aligned through the securing of the members to one another.

7. A construction as set forth in claim 5, in which the outer surface of the hoist casing comprises a portion on the bottom part of one sheet metal member, and including a brake disc having an opening, and means securing said brake disc in that position on said outer surface portion in which the opening of said disc is in aligned relation to a particular bearing opening in the corresponding bottom part.

8. A construction as set forth in claim 7, in combination with a rotating brake disc for coacting with the first brake disc, a shaft mounted on a bearing in said particular bearing opening and connected through splines to the rotating brake disc, and brake operating mechanism mounted on the hoist casing for moving the rotating disc on the splines whereby to control braking pressures between that disc and said first disc.

9. A construction as set forth in claim 5, and including a block part integrally secured to the rim wall of each of the two dish-shaped members that are secured together at their rims, said block parts being juxtaposed to one another whereby in effect to form a block when said two dish-shaped members are secured together, a bore formed through the rim walls of said two members and through said block, a hoist supporting shank extending in said bore and into a casing chamber, and means assembled on said shank and engaging surfaces on both block parts in the chamber to hold said shank assembled to the hoist casing.

10. A hoist casing as set forth in claim 5, in which said integral wall part of each dish-shaped member has a substantially uniform cross sectional shape which is like that of the wall parts on the other two members, and each dish-shaped member having a peripheral shoulder formed on its outer surface, the rim of the third member being assembled in opposed relation to one of the shoulders.

11. A hoist casing as set forth in claim 10, in which the bearing openings are formed at corresponding points on the bottom parts of the members so as to be aligned through the securing of the members to one another.

12. In a hoist of the class described, a casing having a relatively thin wall, a reinforcing block secured to said wall, a hook positioned partially outside the casing and having a part traversing aligned bores formed in said casing and block, a groove in that part of said hook within the casing, a pair of discs lying in said groove and coacting with said casing and block to retain the hook relatively to said casing, means holding said discs in said groove, said casing comprising two members secured to one another by a weld extending along said thin wall, and said reinforcing block including two portions secured one to each casing member and juxtaposed to each other at said weld.

13. A construction as set forth in claim 5, and including said integral wall part of each dish-shaped member having a substantially uniform cross sectional shape which is like that of the wall parts on the other two members, a peripheral shoulder on the outer surface of each member, the rim of the third dish-shaped member being assembled in opposed relation to one of the shoulders, and the bearing openings on the bottom parts of the members being formed at corresponding points so as to be aligned through the securing of the members to one another.

14. A construction as set forth in claim 13, and including a reinforcing block having two parts secured one to the integral wall part of each of the two dish-shaped members that are secured together at their rims, said block parts being juxtaposed to one another at said rims, a bore formed through said rims and block for accepting a hoist support member, a brake disc formed with an opening, and means securing said brake disc in position on the bottom part of one dish-shaped member with the opening of the brake disc in position aligned with a bearing opening in that bottom part.

References Cited

UNITED STATES PATENTS

| | | | |
|---|---|---|---|
| 2,053,055 | 10/1936 | Wadd | 254—168 |
| 2,210,811 | 8/1940 | Kelpsch | 287—135 |
| 2,243,358 | 5/1941 | Robins | 254—168 |
| 2,704,201 | 3/1955 | Robins | 254—167 |

EDWARD A. SROKA, *Primary Examiner.*

EVON C. BLUNK, *Examiner.*

H. C. HORNSBY, *Assistant Examiner.*